United States Patent [19]

Izawa

[11] 4,405,093
[45] Sep. 20, 1983

[54] ENDLESS TAPE TRAVELLING DEVICE

[75] Inventor: Fumio Izawa, Yokohama, Japan

[73] Assignee: Tokyo Shibaura Electric Co., Ltd., Kawasaki, Japan

[21] Appl. No.: 287,820

[22] Filed: Jul. 28, 1981

Related U.S. Application Data

[63] Continuation of Ser. No. 28,649, Apr. 10, 1979, abandoned, which is a continuation of Ser. No. 865,414, Dec. 29, 1977, abandoned.

[30] Foreign Application Priority Data

Jul. 27, 1976 [JP] Japan .................................. 51-89450

[51] Int. Cl.$^3$ ...................... B65H 17/48; G11B 23/10
[52] U.S. Cl. .............................. 242/55.19 R; 352/128; 360/93
[58] Field of Search ................. 242/55.19 R, 55.19 A, 242/198; 360/93, 94; 352/128; 226/181, 183, 184

[56] References Cited

U.S. PATENT DOCUMENTS

| | | |
|---|---|---|
| 2,918,536 | 12/1959 | Appert et al. |
| 3,106,355 | 10/1963 | Warren |
| 3,140,837 | 7/1964 | Cailliot ........................ 242/55.19 R |
| 3,149,207 | 9/1964 | Maxey .......................... 242/55.19 R |
| 3,946,959 | 3/1976 | Sawazaki et al. ........... 242/55.19 A |
| 3,957,219 | 5/1976 | Tsukamoto et al. ......... 242/55.19 A |
| 4,012,006 | 3/1977 | Leshik ......................... 242/55.19 A |

Primary Examiner—Billy S. Taylor
Attorney, Agent, or Firm—Oblon, Fisher, Spivak, McClelland & Maier

[57] ABSTRACT

A recording and/or reproducing apparatus for an endless tape includes a stationary reel around which an endless tape is wound and which has a guide path formed over the inner and outer peripheral faces. The tape is led from the innermost side thereof through the guide path to a recording reproducing head and driving mechanism which are provided within the inner peripheral face of the reel and then wound up on the outermost periphery of the tape wound around the reel.

11 Claims, 2 Drawing Figures

ENDLESS TAPE TRAVELLING DEVICE

This is a continuation of application Ser. No. 28,649, filed Apr. 10, 1979, which is a Continuation of application Ser. No. 865,414 filed Dec. 29, 1977, both now abandoned.

BACKGROUND OF THE INVENTION

This invention relates to a recording and/or reproducing apparatus for an endless tape with a stationary reel.

Heretofore, an endless tape wound around a rotating reel has been taken out from a winding portion by pulling up the innermost side portion of the tape while twisting it. In doing this, however, an excessive unreasonable force would be applied to the tape because of the tape being lifted up aslant, causing substantial abrasion and injury of the tape. Recently has been tried the use of stationary reels to eliminate such defect. In prior art devices there is employed a circular stationary reel with a guide groove extended to the outer periphery from the inner periphery, of the reel. An endless tape portion wound on the outer peripheral surface of the reel is drawn out from its innermost periphery side into the inner periphery side of the reel through the guide groove. Then, the drawn-out tape is forced to cross over the reel by means of inclined guide poles disposed respectively on the inner and outer sides of the reel, and is so guided as to render its width perpendicular to a base plate. Thereafter, the perpendicular tape is rolled round the outermost peripheral side of the winding portion through a tape driving mechanism and a head mechanism. When using such type stationary reel, inclined guide poles are required to be arranged in the middle of the route from the take-out portion to the tape driving mechanism which is subjected to a relatively large tension, so that the tape tension is liable to become uneven across the width of the tape, augmenting the abrasion at upper and lower edge portions of the tape and causing dropout of picture in VTR's.

Further, these prior art devices are additionally defective because of their large overall size.

SUMMARY OF THE INVENTION

Accordingly, an object of this invention is to provide a recording and/or reproducing apparatus for an endless tape free from any excessive or uneven force being applied to a tape and capable of realizing the compactness of the device as a whole.

DETAILED DESCRIPTION OF THE PREFERRED EMBODIMENT

Now there will be described the recording and/or reproducing apparatus for an endless tape according to an embodiment of this invention applied to video tape recorders (VTR's).

Figure 1:
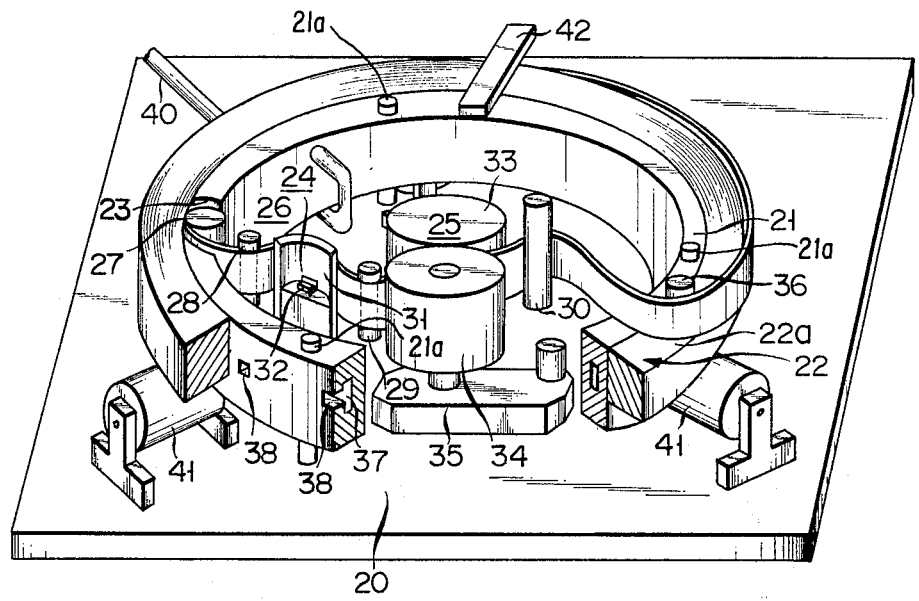
FIG. 1 is a perspective view of a recording and/or reproducing apparatus for an endless tape according to an embodiment of this invention.
Figure 2:
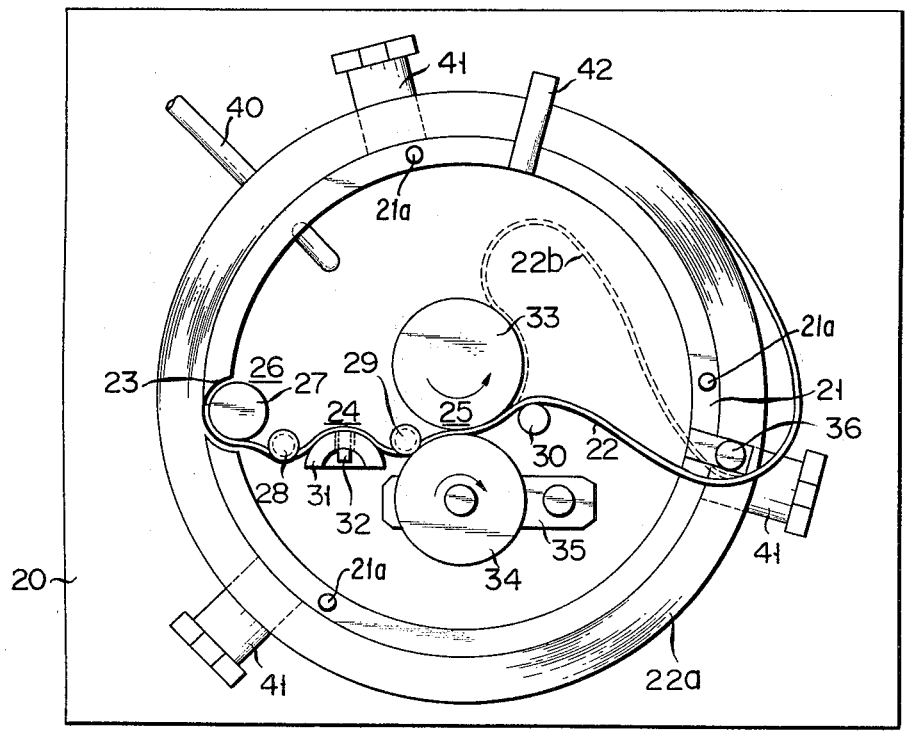
FIG. 2 is a plan view of the device of FIG. 1.

Referring to FIGS. 1 and 2, numeral 21 designates a stationary reel composed of a ring having smooth inner and outer peripheral faces, which is removably fixed to a base plate 20 by any suitable means such as by a plurality of bolts 21a so that it is prevented from rotating. This stationary reel 21 may be formed of stainless steel or synthetic resin with the outer peripheral side face coated with metal. In this stationary reel 21 there is a tape guide notch 23 cut from the outer peripheral face to the inner peripheral face, and a recording/reproducing tape 22 wound on the outer peripheral face of the stationary reel 21 is drawn out from the innermost side of a winding portion 22a into the inner periphery side of the stationary reel 21 through the guide notch 23. On the inner periphery side of the stationary reel 21, that is, in the area enclosed by the stationary reel 21, are a tape scanning mechanism 24, a tape driving mechanism 25, and a guide mechanism 26 for guiding the tape to these mechanisms. The guide mechanism 26 includes cylindrical poles 27, 28, 29, 30 vertically set up on the base plate 21, and having outer peripheral surfaces parallel to the outer peripheral side face of the stationary reel 21. A part of the first guide pole 27 is located inside the guide notch 23 of the stationary reel 21, defining a curved guide path between the peripheral surface of the guide pole 27 and one side face of the guide notch 23. The tape 22, which is drawn out from the innermost side of the winding portion 22a through the guide path, is led to the scanning mechanism 24, the tape 22 being held in a substantially non-twisted relationship with and substantially parallel and flush with the winding portion 22a. The scanning mechanism 24 includes a guide wall 31 with a curved tape guide surface, and a stationary recording/reproducing head 32 supported by the guide wall 31, the tip end of the head 32 extended from the guide surface. The stationary head 32 may be so designed as to move intermittently at regular pitches in the vertical direction against the guide wall 31 or together with the guide wall 31. On both sides of the guide wall 31 there are disposed a pair of guide poles 28 and 29. The tape 22 is curvedly guided between the poles 28 and 29 and the guide wall 31 for scanning, that is, for recording or reproduction by means of the head 32. These guide poles 28 and 29 are each provided with upper and lower flanges at a distance substantially the same as the tape width, so that the vertical or across-the-width vibration of the tape may be prevented by guiding the tape between these flanges.

The tape driving mechanism 25 includes a capstan 33 and a pinch roller 34 disposed on the downstream of the guide pole 29 for pulling out the tape wound on the reel through guide notch 23 and for allowing the tape drawn out from the driving mechanism 25 to be loosened. The capstan 33 may be composed of a stainless steel column with a relatively large diameter, while the pinch roller 34 may be formed of rubber with substantially the same configuration. The pinch roller 34 is rotatably mounted on one end of a support arm 35 with the other end pivotally supported by the base plate 20. Thus, the pinch roller 34 may be selectively rocked between a driving position in which it is pressed against the capstan 33 through the tape 22 and an inserting position where the pinch roller 34 is removed from the capstan 33 thereby facilitating the insertion of the tape between these members 33, 34. A mechanism (not shown) for rocking the support arm 35 may be of any conventional type, and the capstan 33 may be rotated at a high speed by any conventional motor disposed under the base plate 20. Thus, the tape 22 is travelled (caused to travel) between the capstan 33 and pinch roller 34 at a high speed, e.g., 5 to 10 m/sec.

The last guide pole 30 of the guide mechanism 26 is disposed near the outlet side between the capstan 33 and pinch roller 34. The tape, which has passed between the capstan 33 and pinch roller 34, is led to a tape winding guide pole 36 through the capstan side of the pole 30. The guide pole 36 is set up on a support plate extending outwardly from the top face of the stationary reel 21, and the tape 22 is wound on the outermost periphery side of the winding portion 22a by means of the guide pole 36. This pole 36 may alternatively be set up directly on the top wall of the stationary reel 21.

An air passage 37 is formed in the stationary reel 21 substantially along the whole periphery thereof, except for the portion of the guide notch 23. In the outer peripheral surface of the reel are air jet nozzles 38 disposed at regular intervals along the outer peripheral surface of the reel 21 and communicating with the passage 37. The passage 37 is connected to one end of an air pipe 40 with the other end connected to a compressed air source (not shown), the air pipe 40 supplying the passage 37 with air from the compressed air source. The compressed air jet mechanism is not always necessary, though it may provide an effect of facilitating the tape travelling, especially at the start, by supplying air between the stationary reel 21 and tape winding portion 22a.

Against the bottom face of the tape winding portion 22a wound on the stationary reel 21 are held a plurality of (three, in this embodiment) rubber rollers 41 arranged at regular intervals and rotatably mounted on the base plate 20, and thus the outward extension of the tape winding portion 22a by a centrifugal force may be restricted within a proper extent.

The stationary reel 21 is provided with a restraining plate 42 extending from the top face thereof toward above the tape winding portion 22a, which prevents the tape winding portion 22a, in particular the take-up part thereof from rising up while it is rotated.

In a VTR with the aforementioned construction, the capstan 33 is rotated after supplying air to the outer periphery side of the stationary reel 21 by means of the air jet mechanism. Then, tape 22 is pulled forward by the driving mechanism including the capstan 33 and the pinch roller 34 such that the tape is guided to form a winding path having a concave and convex portion as shown in FIG. 2, and wound round the winding portion 22a at a position just below the restraining plate 42 in concurrence with the rotation of the tape winding portion 22a. The tape 22 pulled by the driving mechanism 25 is guided into the inner periphery side of the reel 21 through the guide notch 23 while being kept in parallel with the winding portion 22a, and is subjected to the recording or reproducing operation by means of the magnetic head 32. Thereafter, the tape 22 is led to the guide pole 30 through the driving mechanism 25. At the guide pole portion the tape 22 is attracted on the outer peripheral face of the capstan by means of a negative pressure produced by the rotation of the capstan 33 in the A direction, as indicated by the broken line in FIG. 2, thereby forming a slack portion 22b between the poles 30 and 36. Such slack portion 22b may absorb the variations in the rotation of the tape winding portion 22a, if any.

In the VTR as described above, the tape taken out from the winding portion is always kept in parallel with the winding portion without any twists in the middle of its travel to the take-up portion, and moreover is held flush with the winding portion at the take-out portion to which the largest tension is applied, so that the tape would not subjected to any excessive, uneven force, thus reducing the injury or local abrasion of the tape. Further, the scanning mechanism and driving mechanism are both disposed inside the inner periphery of the stationary reel, the dimensions of the device may practically be determined by the reel dimensions, which will enable us to produce compact devices.

The adjective "stationary" of the stationary reel of the device of the invention means only that the reel never rotates at operation, allowing of the concept of any cassette-type reel removably attached to the base plate. Further, the spirit of the invention is not limited to VTR's but is applicable to sound tape recorders. It is to be understood that the invention may be applied also to devices for carrying the punched tapes for e.g. computers in which other types of scanning mechanisms, such as an optical scanning head, are used in place of an magnetic head. The guide poles of the guide mechanism may not always be cylindrical, though the surfaces of the poles to come in contact with the tape should preferably be curved, that is, free from any angles.

Obviously, numerous modifications and variations of the present invention are possible in light of the above teachings. It is therefore to be understood that within the scope of the appended claims, the invention may be practiced otherwise than as specifically described herein.

What is claimed is:

1. A recording and/or reproducing apparatus which comprises:
    a base plate;
    a stationary reel mounted on the base plate having an annular body around which an endless tape is wound, and first guide means formed in the annular body to communicate the outer peripheral surface of the annular body to the inner peripheral surface thereof;
    a driving mechanism including a capstan and a pinch roller which are disposed inside the inner peripheral face of said stationary reel for pulling out said tape wound on said reel through said first guide means and creating a negative pressure;
    a recording and/or reproducing head disposed inside the inner peripheral face of said stationary reel and between said first guide means and said driving mechanism for scanning the tape;
    second guide means for guiding the tape travelling from said first guide means to said driving mechanism through said recording and/or reproducing head while keeping said tape in a substantially non-twisted relationship with a portion of the tape wound on said stationary reel;
    third guide means guiding the tape over the reel to the outermost periphery of the tape wound on the reel; and
    fourth guide means for guiding the tape passed through said driving mechanism such that the tape is attracted to the outer peripheral face of said driving mechanism by said negative pressure produced by rotation of said driving mechanism thereby forming a loosened portion inside the inner peripheral face of said stationary reel;
    said third guide means guiding the tape passed through said loosened portion over the reel to the outermost periphery of the tape wound on the reel such that the tape drawn out from said driving mechanism forms a winding path to said outermost periphery of the tape wound on the reel.

2. A recording and/or reproducing apparatus which comprises:

a base plate;

a stationary reel mounted on the base plate having an annular body around which an endless tape is wound, and first guide means formed in the annular body to communicate the outer peripheral surface of the annular body to the inner peripheral surface thereof;

a driving mechanism including a capstan and pinch roller which are disposed inside the inner peripheral face of said stationary reel for pulling out said tape wound on said reel through said first guide means such that the tape drawn out from the driving mechanism forms a lossened portion inside the inner peripheral face of said stationary reel;

a recording and/or reproducing head disposed inside the inner peripheral face of said stationary reel and between said first guide means and said driving mechanism for scanning the tape;

second guide means for guiding the tape travelling from said first guide means to said driving mechanism through said recording and/or reproducing head while keeping said tape in a substantially non-twisted relationship with a portion of the tape wound on said stationary reel;

third guide means for guiding the tape passed through said lossened portion to cross over the reel and to the outermost periphery of the tape wound on said reel such that the tape drawn out from said driving mechanism is thereby guided to form a winding path to said outermost periphery of the tape wound on the reel; and fourth guide means for guiding the tape passed through said driving mechanism and for forming said loosened portion inside the inner peripheral face of said stationary reel wherein the tension of the tape passed through said driving mechanism is less than the tension of the tape between the first guide means and said driving mechanism.

3. An apparatus according to claims 1 or 2, wherein said third guide means further comprises means for guiding said loosened portion to cross over the reel and to the outermost periphery of the tape wound on the reel such that the tape drawn out from said driving mechanism is thereby guided to form said winding path so as to include a concave portion and a convex portion.

4. An apparatus according to claims 1 or 2, said capstan and said pinch roller being disposed on said base plate between which the tape is pinched and carried, and said head being disposed on said base plate in contact with the tape between said first guide means and said driving mechanism.

5. An apparatus according to claims 1 or 2, wherein said second guide means further comprises a pair of guide poles disposed at right angles to said base plate on each side of said head for guiding the tape along said head.

6. An apparatus according to claim 1 or 2, wherein said third guide means further comprises a guide pole disposed on said stationary reel for leading the tape above said reel.

7. An apparatus according to claims 1 or 2, wherein said reel has an air passage formed inside said reel into which air is supplied and jet nozzles formed at intervals along the outer periphery of said reel communicating with said air passage for jetting the air from said air passage to the outer peripheral face of said reel.

8. An apparatus according to claims 1 or 2, further comprising at least one roller mounted on said base plate to contact with the tape wound on said stationary reel.

9. An apparatus according to claims 1 or 2, wherein said second guide means and driving mechanism are arranged to guide the tape along a substantially planar path inside the inner peripheral face of said stationary reel.

10. An apparatus according to claims 1 or 2, wherein said fourth guide means further comprises guide means disposed on said base plate and between said driving mechanism and the inner peripheral face of said stationary reel.

11. An apparatus according to claims 1 or 2, further comprising means for preventing the tape from vibrating in a width direction at said head.

* * * * *